United States Patent [19]
Sakamoto et al.

[11] Patent Number: 5,532,872
[45] Date of Patent: Jul. 2, 1996

[54] VIEWING TUBE FOR MICROSCOPE

[75] Inventors: Shinobu Sakamoto; Takeshi Fujino, both of Yokohama, Japan

[73] Assignee: Nikon Corporation, Tokyo, Japan

[21] Appl. No.: 274,389

[22] Filed: Jul. 13, 1994

[30] Foreign Application Priority Data

Dec. 10, 1992 [JP] Japan .................................... 4-352152

[51] Int. Cl.$^6$ ............................. G02B 21/00; G02B 23/00
[52] U.S. Cl. ......................... 359/384; 359/379; 359/413
[58] Field of Search .................................. 359/368, 379, 359/380, 384, 393, 405, 406, 372, 374, 413, 415, 419

[56] References Cited

U.S. PATENT DOCUMENTS

| | | | |
|---|---|---|---|
| 4,299,439 | 11/1981 | Stromblad | 359/384 |
| 4,449,799 | 5/1984 | Turner | 353/39 |
| 4,691,997 | 9/1987 | Muchel | 359/384 |
| 4,798,451 | 1/1989 | Fujiwara | 359/384 |
| 5,319,493 | 6/1994 | Goldsmith | 359/368 |

*Primary Examiner*—Paul M. Dzierzynski
*Assistant Examiner*—Audrey Chang

[57] ABSTRACT

A viewing tube for a microscope has an optical deflecting element such as a mirror for deflecting light from an objective, a supporting member for supporting the optical deflecting element and an eyepiece portion into which the light deflected by the optical deflecting element enters. The supporting member is rotatable around a first shaft and the eyepiece portion is rotatable around a second shaft. An engaging member is mounted on the eyepiece portion in a position whose distance from the second shaft is equal to the distance between the first shaft and the second shaft. Guiding members are provided on the supporting member for engaging with the engaging member and restricting the engaging member in the circumferential direction around the first shaft, so that the supporting member and the optical deflecting element are rotated around the first shaft in accordance with rotation of the eyepiece portion around the second shaft.

11 Claims, 6 Drawing Sheets

VIEWING TUBE FOR MICROSCOPE

BACKGROUND OF THE INVENTION

1. Field of the Invention

The present invention relates to a viewing tube for a microscope and more particularly to a viewing tube for a microscope whose tilt angle can be changed continuously.

2. Related Background Art

Conventionally, in a viewing tube for a microscope, an eyepiece portion can be inclined in accordance with an observer's physique and posture prior to observation. For that purpose, an optical deflecting device needs to be inclined so as to make its deflection angle coincide with the tilt angle of the eyepiece portion. A conventional viewing tube for a microscope will be described with reference to FIGS. 5 and 6. FIG. 5 is a cross section of the viewing tube and FIG. 6 is a cross section showing a principal portion thereof.

In FIG. 5, an eyepiece portion 41 is rotatable around a shaft 42. A gear 43 is provided coaxially with the shaft 42 and fixed to the eyepiece portion 41. The shaft 42 is fixed to a case 44, to which a prism 45 is mounted. The case 44 is rotatable around a shaft 47 fixed to a base 46. A gear 48 is fixed to the base 46 so as to be coaxial with the shaft 47. The gear 43 is meshed with the gear 48. A lower portion of the base 46 is provided with a ring mounting 46a whose cross section is dovetail-shaped. The viewing tube is connected to a main body of the microscope via the ring mounting 46a.

An optical axis of incident light from an objective (not shown) provided on the main body of the microscope is deflected by the prism 45 and enters eyepiece 50 via the eyepiece portion 41 along an optical axis 50a of the eyepiece portion 41.

Referring to FIG. 6, when the eyepiece portion 41 is rotated around the shaft 42, the case 44 rotates around the shaft 42. If the number of teeth of the gear 43, the angle of rotation thereof, the number of teeth of the gear 48, the angle of rotation of the case 44 around the shaft 47 are Za, θa, Zb and θc respectively and Za=Zb, θa=2θc. Therefore, when the eyepiece portion 41 is rotated around the shaft 42 through the angle of θa to change its tilt angle, the prism 45 is rotated through the angle of θa/2, whereby the optical axis 49 of the incident light is deflected at the angle of θa to coincide with the optical axis 50b of the eyepiece portion 41.

The above-described arrangement suffers from a number of disadvantages. For one thing, the gears are expensive. Further, in order to eliminate the backlash between the gears due to the error of the distance between the centers of the gears, the error of the pitch diameter of each gear or the like, it is necessary to adjust the distance between the centers of the gears or to mesh the gears with each other by displacing one of the gears in the circumferential direction. Therefore, the structure or the adjustment in assembly becomes complicated.

SUMMARY OF THE INVENTION

It is an object of the present invention to provide a viewing tube for a microscope which has a simple structure and can be formed at low cost and in which the tilt angle of an eyepiece portion can be changed continuously.

In order to achieve the above object, a viewing tube for a microscope of the present invention has an optical deflecting element such as a mirror for deflecting light from an objective, a supporting member for supporting the optical deflecting element and an eyepiece portion into which the light deflected by the optical deflecting element enters. The supporting member is rotatable around a first shaft and the eyepiece portion is rotatable around a second shaft. An engaging member is mounted on the eyepiece portion so as to engage with the supporting member in a position whose distance from the second shaft is equal to the distance between the first shaft and the second shaft so that the supporting member and the optical deflecting element are rotated around the first shaft in accordance with rotation of the eyepiece portion around the second shaft.

According to the above structure, when the eyepiece portion is rotated, the engaging member provided on the eyepiece portion, the supporting member and the optical deflecting element are rotated. In this case, the first shaft and the engaging member are kept on the same circumference around the second shaft. Therefore, an angle formed by positions of the engaging member before and after rotation together with the second shaft and an angle formed by the positions of the engaging member before and after rotation together with the first shaft have a relationship between the central angle and the angle of circumference such that the angle of rotation of the optical deflecting element supported to the supporting member around the first shaft becomes half of the angle of rotation of the eyepiece portion around the second shaft, whereby the deflection angle of the light from the objective becomes equal to the angle of rotation of the eyepiece portion.

DETAILED DESCRIPTION OF THE PREFERRED EMBODIMENTS

Figure 1:
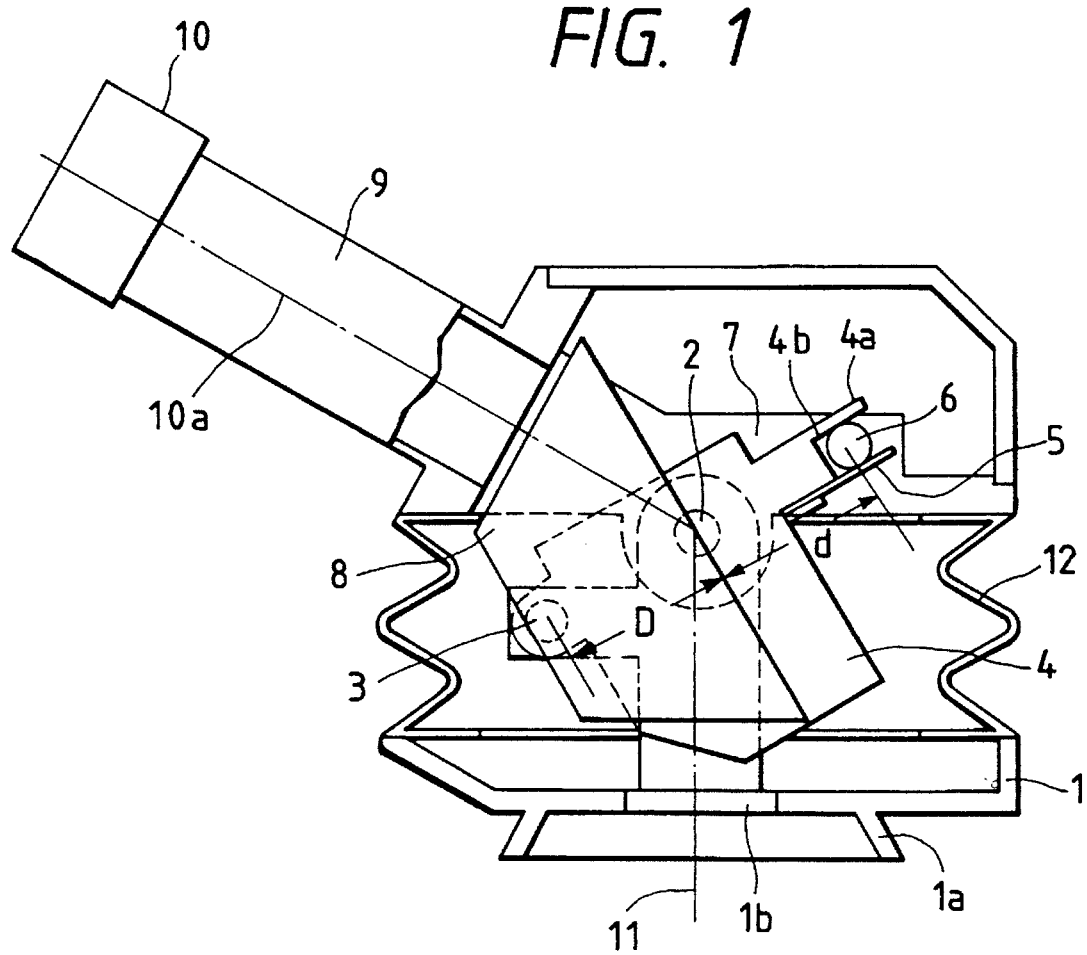
FIG. 1 is a cross section showing a viewing tube for a microscope according to a first embodiment of the present invention.
Figure 2:
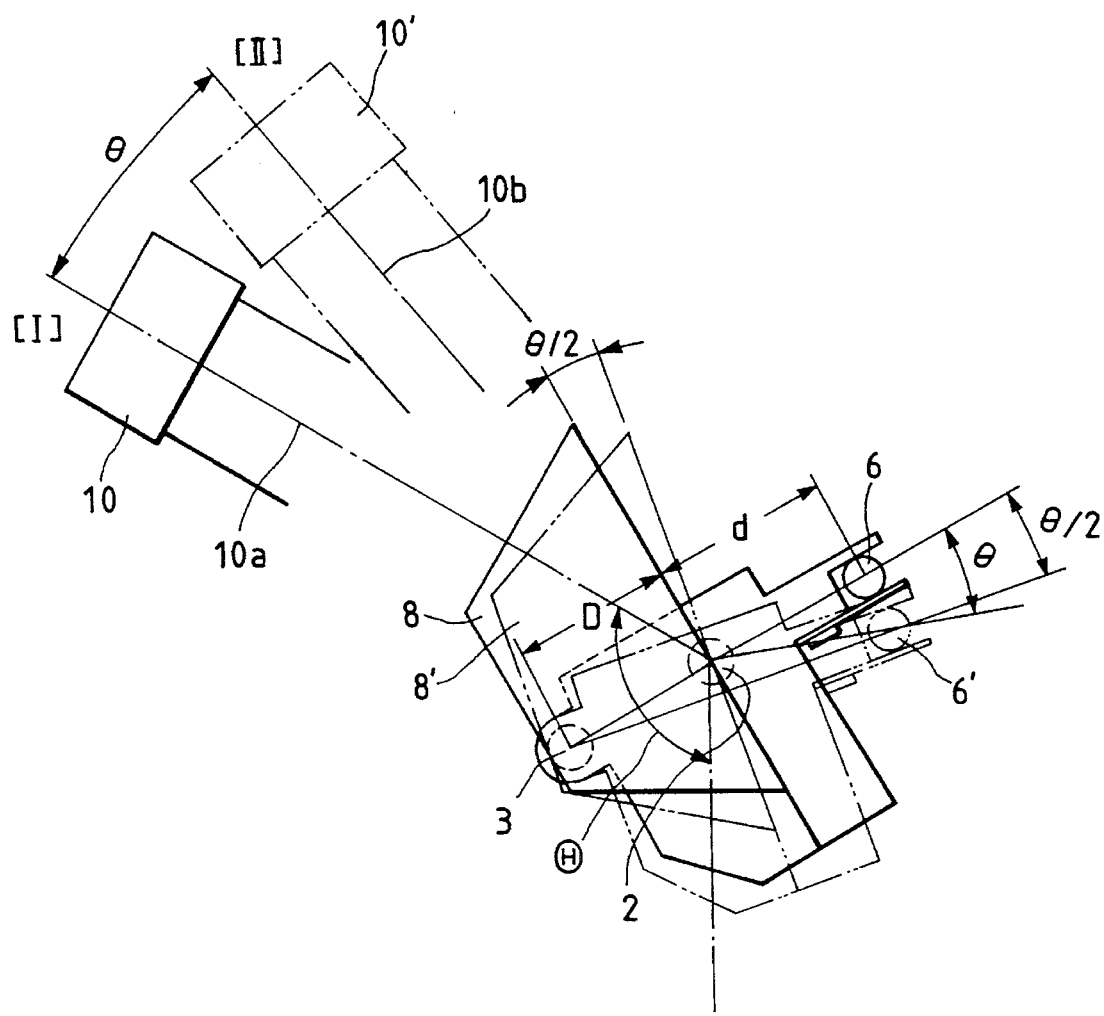
FIG. 2 is a cross section showing a principal portion of the viewing tube of FIG. 1.

A first embodiment of the present invention will be described with reference to FIGS. 1 and 2. FIG. 1 is a cross section showing a viewing tube for a microscope of the first embodiment and FIG. 2 is a cross section showing a principal portion of FIG. 1.

Light 11 from an objective (not shown) enters a roof prism 8 via an opening 1b provided in a base 1 and is deflected by the roof prism 8 at a desired angle. Thereafter, the light 11 enters an eyepiece portion 9 and reaches an eyepiece 10. A lower portion 1a of the base 1 is a ring mounting whose cross section is dovetail-shaped. The viewing tube is connected to a main body of the microscope via the ring mounting 1a.

The eyepiece portion 9 is rotatable around a second shaft 2. Although the second shaft 2 is fixed to the base 1, the eyepiece portion 9 is connected to the base 1 only via a bellows 12, so it can be rotated freely.

The roof prism 8 is held by a case 4, which is rotatable around a first shaft 3 fixed to the base 1. A plate-like projection 4a is provided on an end of the case 4. Also, a leaf spring 5 is fixed to the case 4 so as to be in opposition to the projection 4a. A guide space is formed between the projection 4a and the leaf spring 5 so as to extend in the radial direction with the shaft 3 as the center. An eyepiece base portion 7 is provided with an engaging pin 6 in the shape of a column. The distance D between the second shaft 2 and the first shaft 3 is equivalent to the distance d between the second shaft 2 and the engaging pin 6. The engaging pin 6 is held slidably between the projection 4a and the leaf spring 5. An inner surface 4b of the projection 4a is a flat surface in the radial direction with the shaft 3 as the center and the engaging pin 6 is urged by the leaf spring 5 toward the inner surface 4b.

The engaging pin 6 is mounted on the eyepiece base portion 7 so as to be rotatable around an axle (not shown) passing not the center of the engaging pin 6 but a different position thereof and being parallel to the second shaft 2. Therefore, by rotating the engaging pin 6, a contact position of the engaging pin 6 and the inner surface 4b can be easily changed to adjust the distance between the second shaft 2 and the engaging pin 6.

Next, the operation of rotating the eyepiece portion 9 and the roof prism 8 will be described.

As shown in FIG. 2, the eyepiece portion 9 is in the condition [I] initially. The light 11 is deflected by the roof prism 8 at an angle H and reaches the eyepiece 10 along the optical axis 10a. At this time, the second shaft 2, the first shaft 3 and the engaging pin 6 are substantially on a straight line.

Next, when the eyepiece portion 9 is elevated through an angle θ, it is shifted to the condition [II] as indicated by a broken line. Namely, the eyepiece base portion 7 is rotated around the second shaft 2, whereby the engaging pin 6 rotates around the second shaft 2 at the angle θ to be in a position 6'. According to this rotation, the engaging pin 6 pushes the case 4 via the leaf spring 5, so that the case 4 rotates together with the roof prism 8 around the first shaft 3 and the engaging pin 6 moves in the guide space between the leaf spring 5 and the projection 4a toward the first shaft 3. At this time, the engaging pin 6 mounted on the eyepiece base portion 7 is pressed by the leaf spring 5 against the inner surface 4b of the projection 4a so that undesirable play between the engaging pin 6 and the inner surface 4b is easily eliminated, while the engaging pin 6 can be slid smoothly between the leaf spring 5 and the inner surface 4b due to the resiliency of the leaf spring 5.

The first shaft 3 and the engaging pin 6 are on the circumference of the same circle drawn by the radius D (=d) with the second shaft 2 as its center. Therefore, the angle formed by the engaging pin at 6, the first shaft 3 and the engaging pin at 6' and the angle formed by the engaging pin at 6, the second shaft 2 and the engaging pin at 6' have the relationship between the angle of circumference and the central angle with respect to the same arc such that the angle of rotation of the case 4 around the first shaft 3 is θ/2.

The roof prism 8 is rotated through the angle of θ/2 the same as the case 4 and the deflection angle of the optical axis of the incident light 11 is increased by θ, so the optical axis of the light 11 coincides with an optical axis 10b of the eyepiece portion 9 in the condition [II].

Strictly speaking, the center of rotation of the roof prism 8 is not on the reflecting surface of the optical axis of the incident light 11 but is the first shaft 3, so that the reflecting position of the incident light in the roof prism 8 in the condition [I] does not coincide with that of the incident light in the roof prism 8 in the condition [II]. Therefore, in the condition [I] and the condition [II], the optical axis of the incident light in the eyepiece base portion 7 is shifted parallel in the drawing. That is, in accordance with rotation of the eyepiece base portion 7, the movement of an image occurs in the eyepiece 19. When the amount of the movement is large and cannot be neglected, the roof prism 8 should be provided in an afocal optical system so as to prevent the movement of an image in the eyepiece 19.

When the eyepiece portion 9 is rotated through the angle θ in the opposite direction from the condition [II], the engaging pin 6 presses the case 4 via the inner surface 4b of the projection 4a of the case 4, so the case 4 rotates together with the roof prism 8 around the first shaft 3 to be in the condition [I].

Figure 3:
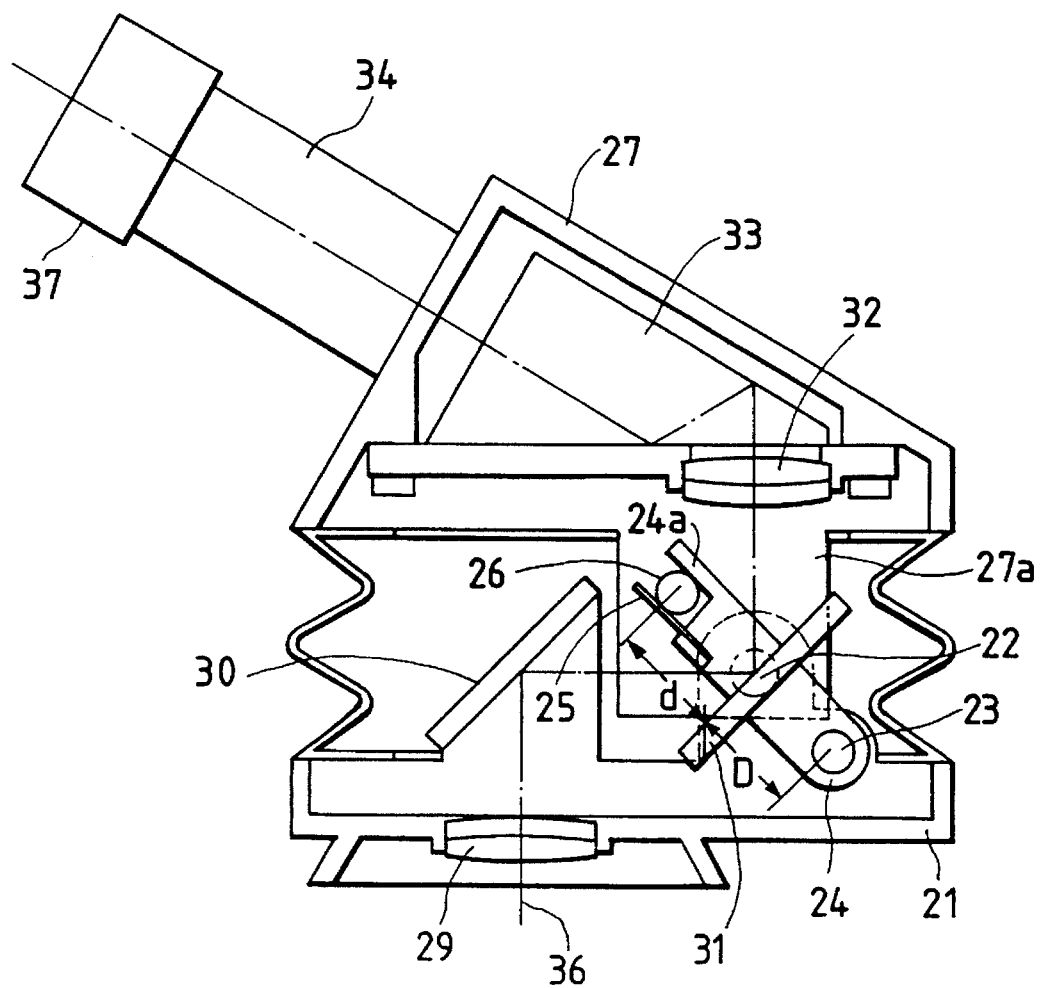
FIG. 3 is a cross section showing a viewing tube for a microscope according to a second embodiment of the present invention.

Next, a viewing tube for a microscope according to a second embodiment of the present invention will be described with reference to FIGS. 3 and 4. FIG. 3 is a cross section showing the viewing tube and FIG. 4 is a cross section showing a principal portion of FIG. 3.

Light 36 from an objective (not shown) enters a first lens 29 and is reflected by a first deflection mirror 30 fixed to a base 21 and by a second deflection mirror 31. Then, the light 36 enters a second lens 32 and an eyepiece portion 34 via a prism 33 and reaches an eyepiece 37. The lenses 29 and 32 constitute an afocal system.

The second deflection mirror 31 is fixed to a holder 24 which is rotatable around a first shaft 23. The eyepiece portion 34 is fixed to a housing 27. The housing 27 is held rotatably around a second shaft 22. An engaging pin 26 is mounted on an end portion 27a of the housing 27 such that the distance D between the second shaft 22 and the first shaft 23 is equal to the distance d between the second shaft 22 and the engaging pin 26. A plate-like projection 24a is provided on the holder 24 supporting the deflection mirror 31. A leaf spring 25 is mounted on the holder 24 so as to be in opposition to the projection 24a. The engaging pin 6 is held between the projection 24a and the leaf spring 25, whereby the housing 27 is in engagement with the holder 24.

Figure 4:
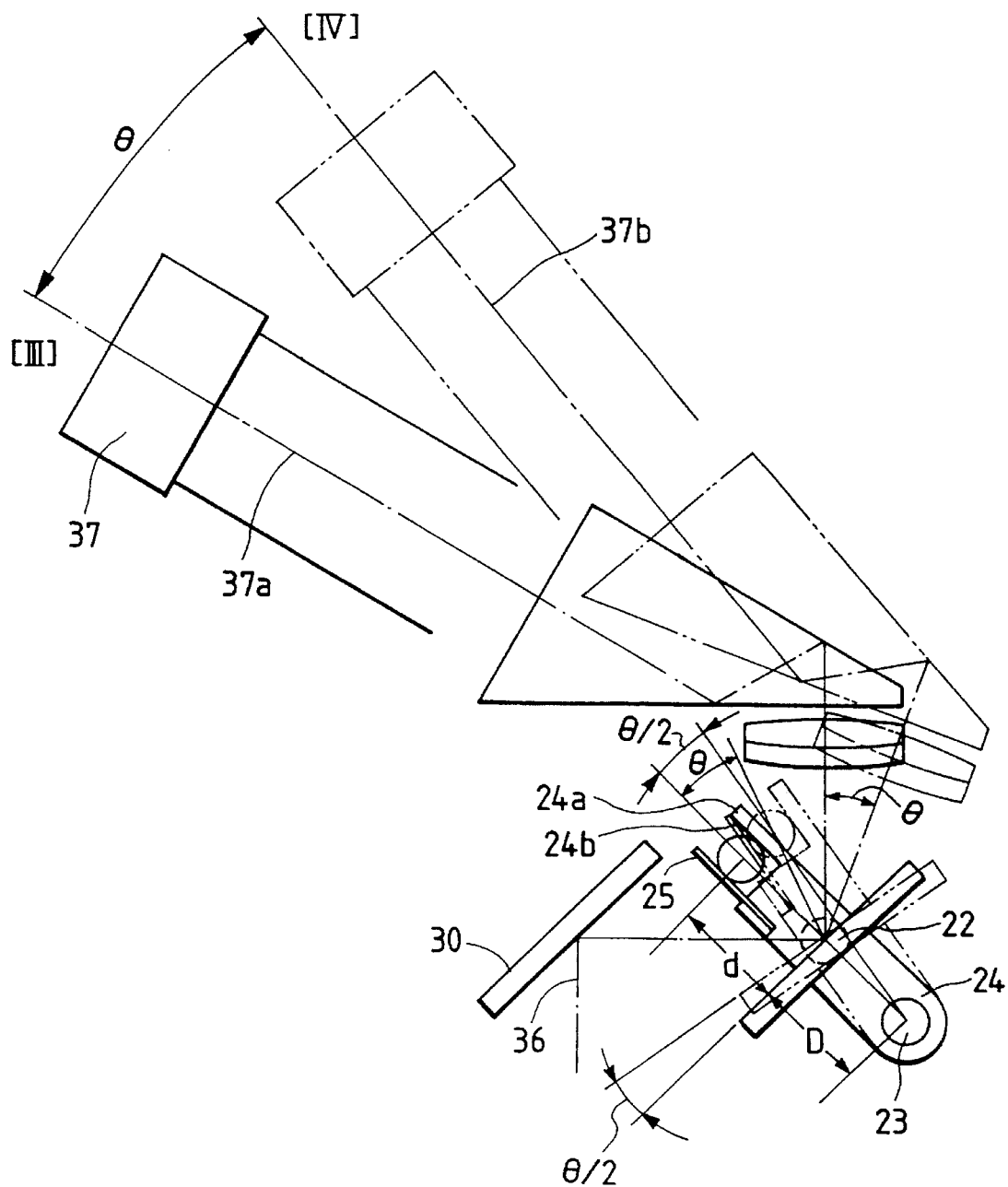
FIG. 4 is a cross section showing a principal portion of the viewing tube of FIG. 3.
Figure 5:
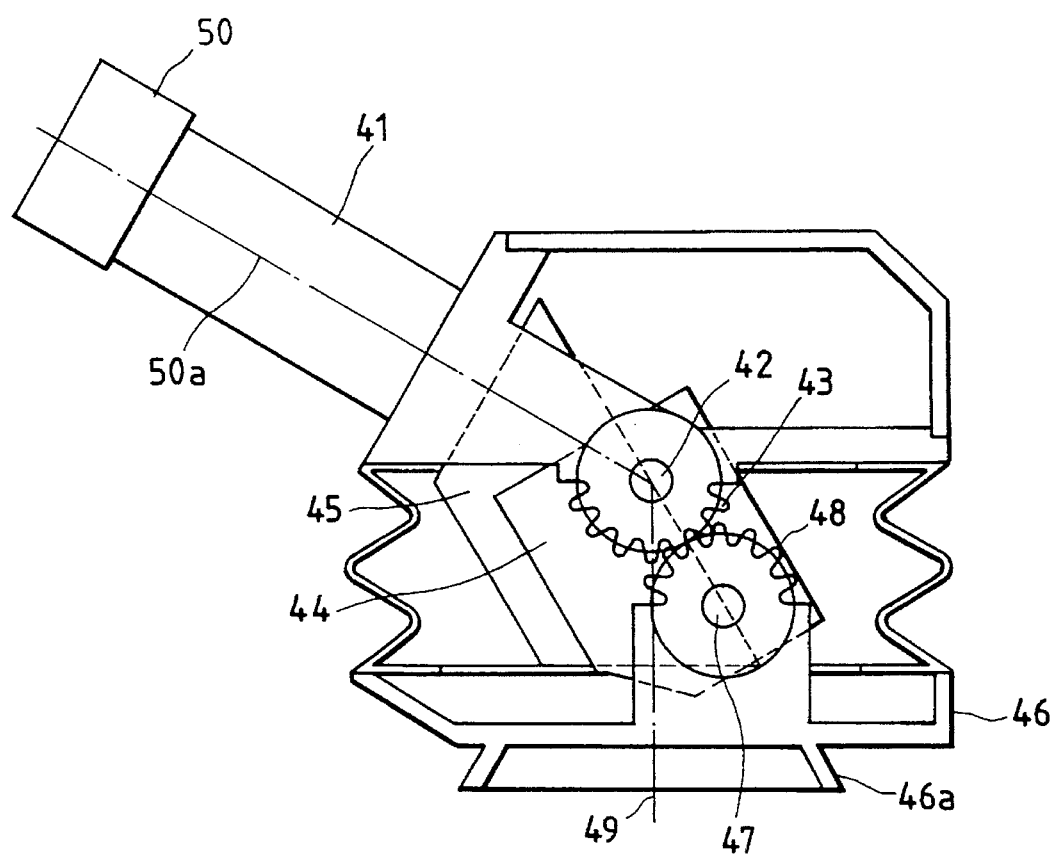
FIG. 5 is a cross section showing a conventional viewing tube for a microscope.
Figure 6:
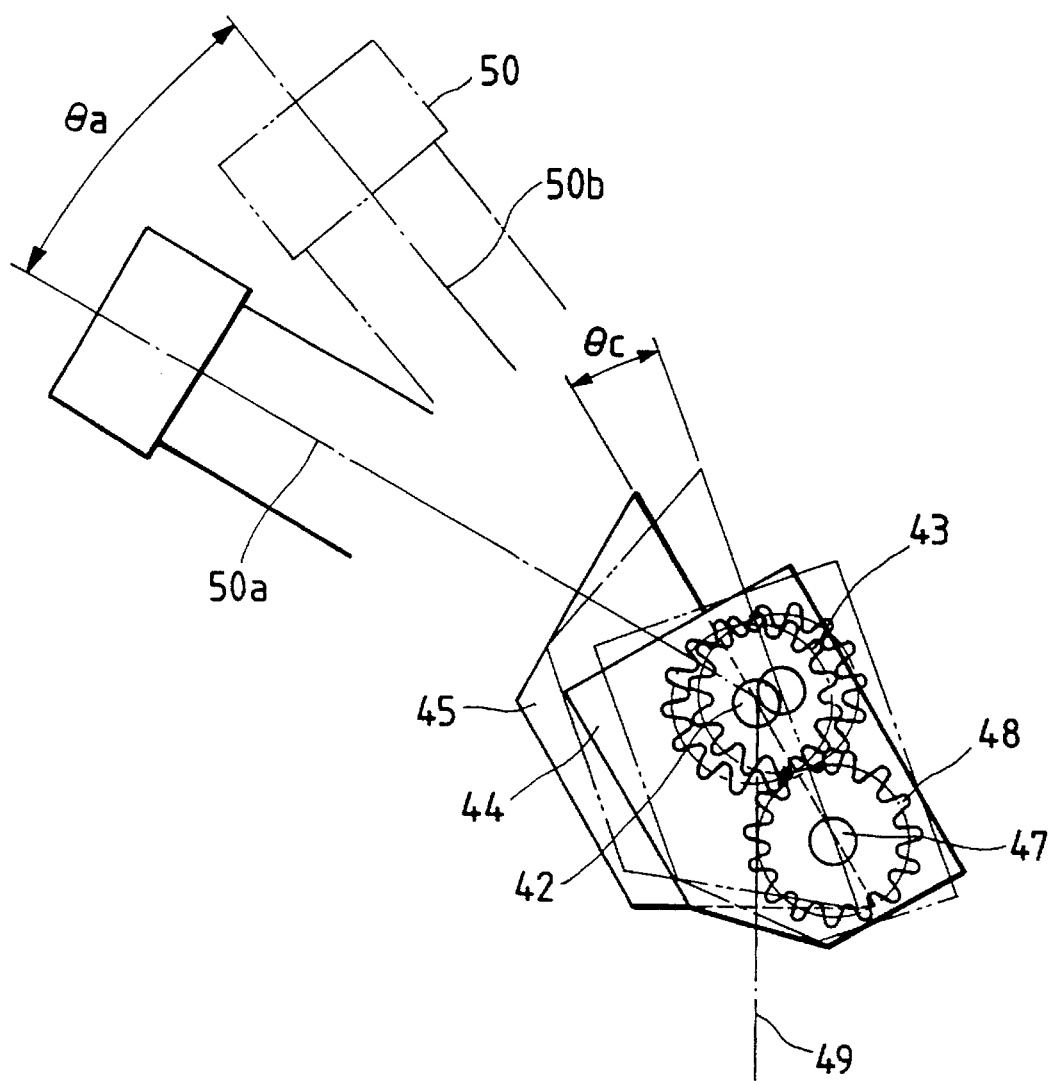
FIG. 6 is a cross section showing a principal portion of the viewing tube of FIG. 5.

When the eyepiece portion 34 is elevated through an angle θ from a position [III] indicated by a solid line in FIG. 4 to a position [IV] indicated by a broken line, the housing 27 rotates around the second shaft 22 through the angle θ. At this time, the engaging pin 26 rotates together with the housing 27 through the angle θ and pushes an inner surface 24b of the projection 24a of the holder 24. As a result, the holder 24 rotates around the first shaft 23 through an angle of θ/2. Accordingly, the light directed from the first deflection mirror 30 to the second deflection mirror 31 is deflected by the second mirror 31 at the angle θ, so that the optical axis of the eyepiece portion 34 is changed from an optical axis 37a to an optical axis 37b.

In both the above embodiments, the engaging pin is pressed only by the leaf spring against the inner surface of the projection provided on the member for supporting the optical deflecting element, so that play of the engaging pin is easily eliminated and the engaging pin can be slid smoothly between the leaf spring and the inner surface due to the resiliency of the leaf spring.

Also, as the engaging pin 6 is mounted on the eyepiece portion so as to be rotatable around an axle passing not the center of the engaging pin 6 but a different position thereof and being parallel to the second shaft, the distance between the second shaft and the engaging pin 6 can be easily adjusted by rotating the engaging pin 6.

What is claimed is:

1. A viewing tube for a microscope, comprising:

an optical deflecting element for deflecting light from an objective;

a supporting member for supporting said optical deflecting element, said supporting member being rotatable around a first shaft;

an eyepiece tube member having an eyepiece tube into which light deflected by said optical deflecting element enters, said eyepiece tube member being rotatable around a second shaft which is parallel to said first shaft and spaced from said first shaft by a predetermined distance in a radial direction of said first shaft; and a connecting mechanism for connecting said supporting member and said eyepiece tube member at a position whose distance from said second shaft in a radial direction of said second shaft is substantially equal to said predetermined distance, so that said supporting member and said optical deflecting element are rotated around said first shaft in accordance with rotation of said eyepiece tube member around said second shaft.

2. A viewing tube for a microscope according to claim 1, wherein said connecting mechanism includes an engaging member provided on said eyepiece tube member and a guiding portion provided on said supporting member and engaged with said engaging member for restricting said engaging member in a circumferential direction around said first shaft with respect to said supporting member.

3. A viewing tube for a microscope according to claim 2, wherein said guiding portion includes a resilient member.

4. A viewing tube for a microscope according to claim 3, wherein said resilient member is a leaf spring.

5. A viewing tube for a microscope according to claim 2, wherein said guiding portion includes a guide surface and a leaf spring in opposition to said guide surface and said engaging member is held slidably between said guide surface and said leaf spring.

6. A viewing tube for a microscope according to claim 2, wherein said engaging member is rotatable relative to said eyepiece tube member about an axis which is eccentric with respect to said engaging member.

7. A viewing tube for a microscope according to claim 1, wherein said optical deflecting element is a roof prism.

8. A viewing tube for a microscope according to claim 1, wherein said optical deflecting element is a mirror.

9. A viewing tube for a microscope, comprising:

an optical deflecting element for deflecting light from an objective, said optical deflecting element being rotatable around a first shaft;

an eyepiece tube member having an eyepiece tube into which light deflected by said optical deflecting element enters, said eyepiece tube member being rotatable around a second shaft which is parallel to said first shaft and spaced from said first shaft by a predetermined distance in a radial direction of said first shaft; and a connecting mechanism for connecting said optical deflecting element and said eyepiece tube member at a position whose distance from said second shaft in a radial direction of said second shaft is substantially equal to said predetermined distance.

10. A viewing tube for a microscope according to claim 9, wherein said connecting mechanism includes an engaging member provided on said eyepiece tube member and a guiding portion provided on said supporting member and engaged with said engaging member for restricting said engaging member in a circumferential direction around said first shaft with respect to said supporting member.

11. A viewing tube for a microscope according to claim 10, wherein said engaging member is rotatable relative to said eyepiece tube member about an axis which is eccentric with respect to said engaging member.

* * * * *